July 11, 1961 W. A. HARDIN 2,991,842
PORTABLE SEAT OR THE LIKE
Filed Dec. 11, 1959
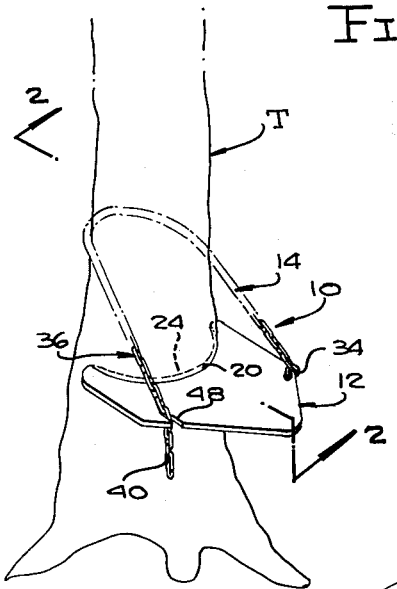
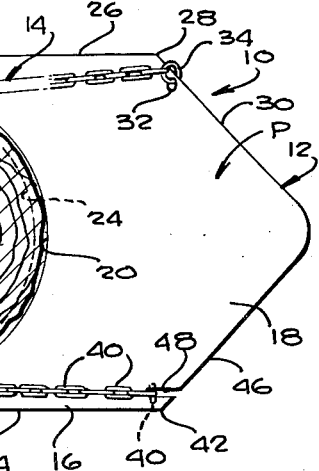
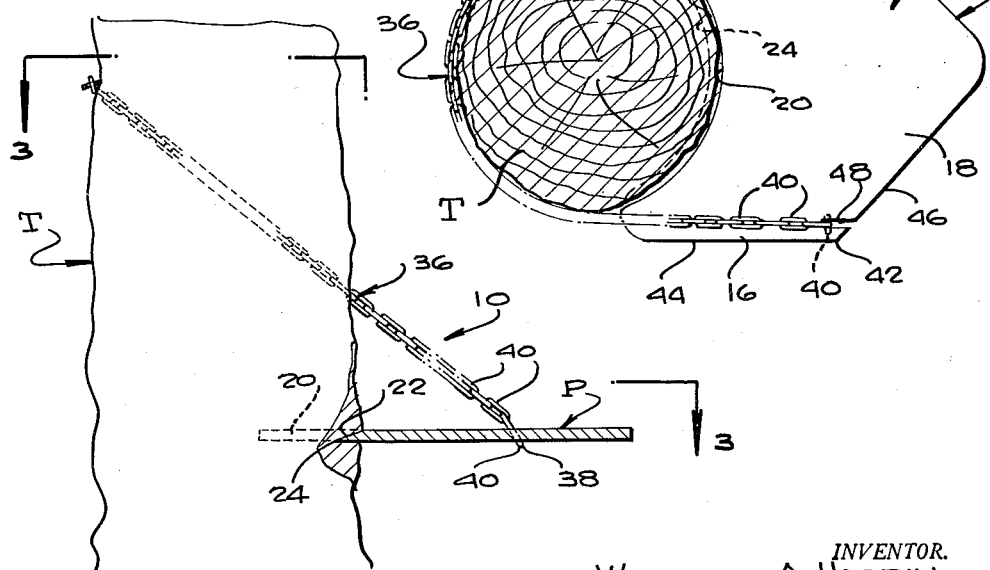
INVENTOR.
WOODWARD A. HARDIN
BY
McMorrow, Berman & Davidson
ATTORNEYS

2,991,842
PORTABLE SEAT OR THE LIKE
Woodward A. Hardin, Humnoke, Ark.
Filed Dec. 11, 1959, Ser. No. 858,930
1 Claim. (Cl. 182—187)

This invention relates to a novel portable seat or the like for removable mounting on a post, such as a tree trunk.

The primary object of the invention is to provide a simple, strong, and safe device of the kind indicated, especially but not exclusively for use by sportsmen, which makes a flat, thin, and compact, small mass package, when not in use, so as to be easily stowed in a bag or elsewhere or otherwise carried in the field.

Another object of the invention is to provide a device of the character indicated above which is composed of only two parts, the seat component, and the mounting component, the latter being adjustably securable to the seat component in a manner to securably encircle posts of different diameters, and permit quick and easy mounting of the device on tree trunks, fence posts, utility poles, camp poles, pier piles, and the like, in the field and elsewhere.

Other important objects and advantageous features of the invention will be apparent from the following description and the accompanying drawings, wherein, for purposes of illustration only, a specific form of the invention is set forth in detail.

In the drawings:

FIGURE 1 is a schematic perspective view showing a device of the invention mounted on a tree trunk;

FIGURE 2 is an enlarged vertical section taken on the line 2—2 of FIGURE 1; and, FIGURE 3 is a horizontal section taken on the line 3—3 of FIGURE 2.

Referring in detail to the drawings, wherein like numerals designate like parts throughout the several views, the illustrated device, generally designated 10, consists of a seat component 12, and a mounting component 14.

The seat component 12 preferably cosists of a single flat plate of rigid material, having a preferably rectangular portion 16 and a triangular portion 18 as an extension on one end of the rectangular portion 16. The other end of the rectangular portion 16 is formed with a semi-circular cutout 20, of a diameter to accept posts of contemplated diameters, such as a tree trunk T.

The cutout 20 is provided with suitable post indenting means, such as a downward bevel 22 resulting in a sharp edge 24, preferably at the underside of the plate P, and extending substantially all the way around the cutout.

The plate P has sufficient rigidity to preclude buckling and twisting thereof under a man's weight, and can be made of any suitable material, but preferably of metal, such as steel. To endow the edge 24 with sufficient rigidity and ability to hold a sharp edge, the same can be provided of steel, either as an integral part of the plate P, as herein shown, or as an attachment, in the cases of the plate P being made of metal other than steel, or of wood or of composition material.

At one side edge 26 of the plate P, adjacent to the corner 28 made by the meeting of the edge 26 with the edge 30 of the triangular plate portion 18, the plate has pivotally secured thereto, as by being passed through a hole 32 in the plate portion 18, a chain connector, such as a ring 34, to which the tethered end of a link chain 36 is connected.

The chain 36 is of sufficient length to go around any contemplated post and more than reach to the side of the plate P remote from the chain connector 34, with its free end 38. The chain 36 is heavy and strong enough for all anticipated strains thereon, and has relatively large links 40 to make good frictional and/or biting contact with a post around which the chain is trained.

For anchoring the free end of the chain 36, suitable means is provided on the plate P, in the region of the corner 42 defined by the meeting of the side edge 44 and the edge 46 of the triangular portion 18, such as a longitudinal slot 48, formed in the triangular portion and opening through the edge 46. The slot 48 is of such a width that a chain link can be passed edgewise downwardly therethrough, and when such link is then turned at right angles the link bridges the slot and bears retainably against the underside of the plate P. This arrangement enables the effective length of the chain 36 to be quickly and easily adjusted so as to tightly snub the chain around any given post, such as the illustrated tree trunk T, at a point above the plate P, with the plate in a horizontal position and with the cutout 20 receiving the post, and the edge 24 biting into the post, and the chain declining at a suitable angle toward the plate P.

It is obvious that the device 10, when suitably set up and placed, can serve as a seat, a table, or as a machan, and for supporting various articles from pests.

While there has been shown and described herein a preferred form of the invention, it is to be understood that the invention is not necessarily confined thereto, and that any change or changes in the structure of and in the relative arrangements of components thereof are contemplated as being within the scope of the invention as defined by the claim appended hereto.

What is claimed is:

A portable seat comprising a flat seat plate having first and second ends and opposed side edges, a post receiving cutout in said first end, an elongated flexible member having a first end connected to the seat plate at a point located near one side edge and spaced from the ends of the plate, said member having an intermediate post embracing portion, said member having a second free end, and means on the seat plate located at a point near the other side edge and spaced from the ends of the plate for securing the free end of the said member to the seat plate in length adjusted condition, said cutout having post indenting means therealong, consisting of a sharp edge.

References Cited in the file of this patent
UNITED STATES PATENTS

| | | |
|---|---|---|
| 683,527 | Upthegrove | Oct. 1, 1901 |
| 2,394,203 | Pruder | Feb. 5, 1946 |